United States Patent [19]

Fleischer et al.

[11] Patent Number: 4,524,808
[45] Date of Patent: Jun. 25, 1985

[54] VACUUM CLEANER HOSE

[75] Inventors: Wolfgang Fleischer, Elfershausen; Leo Eichelberger, Rüsselsheim; Georg Endress, Frankfurt, all of Fed. Rep. of Germany

[73] Assignees: Siemens Aktiengesellschaft, Berlin and Munich; Technochemie Kessler & Co. GmbH, Frankfurt am Main, both of Fed. Rep. of Germany

[21] Appl. No.: 575,576

[22] Filed: Jan. 31, 1984

[30] Foreign Application Priority Data

Jan. 31, 1983 [DE] Fed. Rep. of Germany ....... 3303181

[51] Int. Cl.³ .......................... F16L 11/12; A47L 9/24
[52] U.S. Cl. ..................................... 138/103; 138/121; 138/178; 138/111; 174/47; 174/97
[58] Field of Search ................. 138/103, 99, 111, 121, 138/122, 137, 156, 172, 178; 174/47, 68 C, 97, 98; 15/257 A

[56] References Cited

U.S. PATENT DOCUMENTS

| 3,327,049 | 6/1967 | Brown et al. ...................... 174/47 X |
| 3,455,336 | 7/1969 | Ellis ....................................... 138/156 |
| 3,715,454 | 2/1973 | Kleykamp ....................... 138/121 X |
| 3,961,647 | 6/1976 | Doubleday ........................... 138/103 |
| 4,194,081 | 3/1980 | Medford et al. ....................... 174/47 |
| 4,368,348 | 1/1983 | Eichelberger et al. ................ 174/47 |

FOREIGN PATENT DOCUMENTS 2505144  8/1975  Fed. Rep. of Germany ........ 174/47

*Primary Examiner*—James E. Bryant, III
*Attorney, Agent, or Firm*—Kenyon & Kenyon

[57] ABSTRACT

A supplementary hose attached to a main vacuum cleaner hose for carrying an electrical line is seated in a groove formed in the outside surface of the main vacuum cleaner hose. To increase the flexibility of the vacuum cleaner hose in all directions, the wall of the supplementary hose is perforated.

4 Claims, 3 Drawing Figures

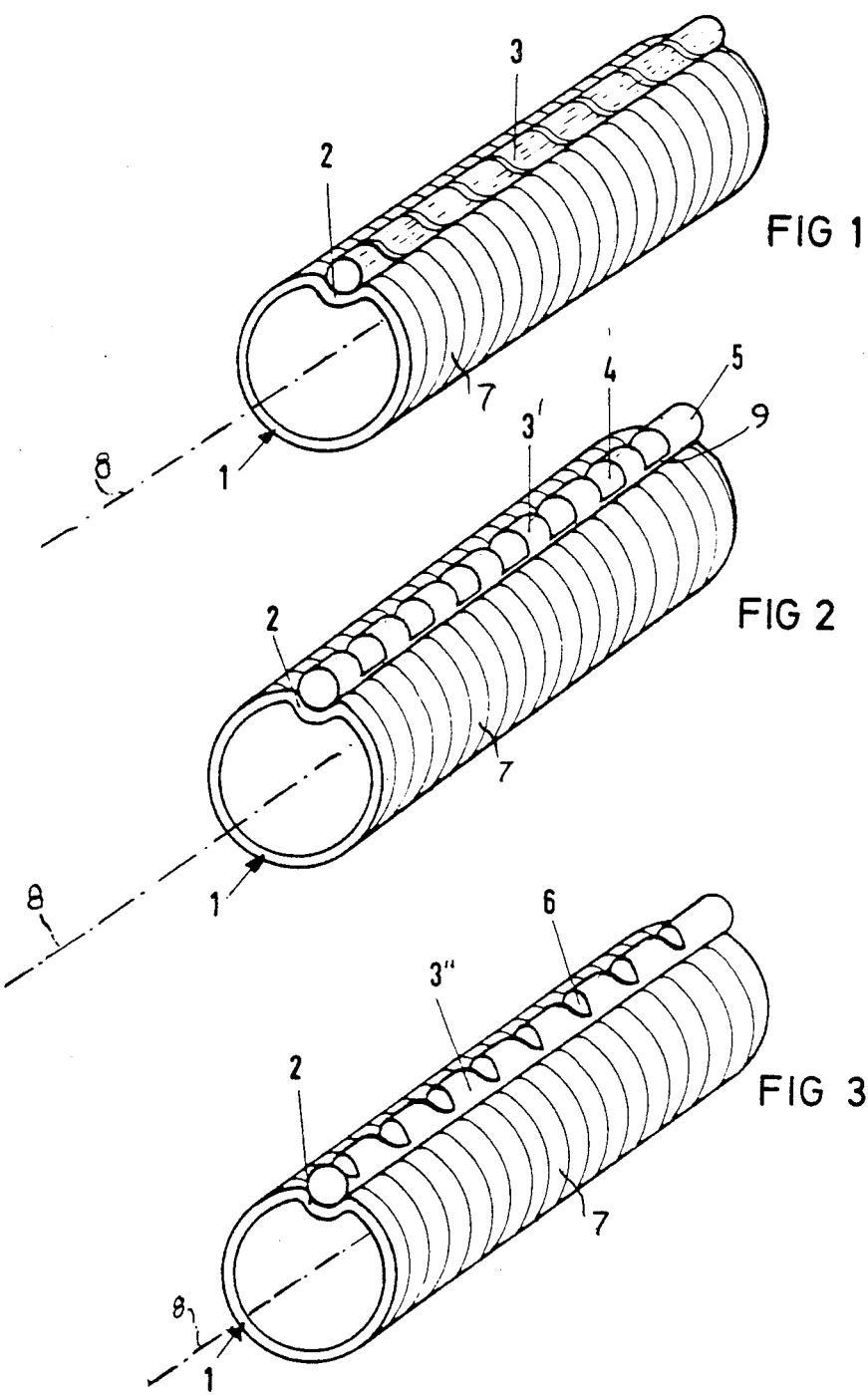

VACUUM CLEANER HOSE

BACKGROUND OF THE INVENTION

This invention relates to a vacuum cleaner hose provided with an ancillary or supplementary hose containing an electrical line.

A vacuum cleaner hose having a flexible cylindrical wall with a longitudinal slot or groove disposed on the outside surface of the wall is described in German Open Patent Application (Deutsche Offenlegungsschrift) No. 30 44 068. As disclosed in that patent application, the main vacuum cleaner hose can have smooth walls or corrugated walls. Similarly, the supplementary vacuum cleaner hose can have smooth walls or corrugated walls. It has been found that, if a smooth walled supplementary hose is used, a noticeable stiffening occurs owing to bending limitations inherent in a smooth hose.

An object of the present invention is to provide an improved vacuum cleaner hose of the above-mentioned type in which stiffening of the hose is eliminated in substantially all directions.

Another object of the present invention is to provide such a vacuum cleaner hose in which the supplementary hose exhibits marked elasticity and is easy to fabricate.

SUMMARY OF THE INVENTION

A vacuum cleaner hose in accordance with the present invention comprises a flexible main hose having a casing or wall wall extending in part in a longitudinal direction and a flexible supplementary hose for housing an electrical line, the supplementary hose extending parallel to the main hose along the longitudinal dimension thereof. The wall of the main hose has on an outer surface a groove extending in the longitudinal direction. The supplementary hose is attached to the main hose at the groove and is disposed in part in the groove. The supplementary hose has a perforated wall for increasing the flexibility of the vacuum cleaner hose.

In accordance with particular features of the present invention, the perforated wall of the supplementary hose takes the form of a helix or, alternatively, is provided with cuts extending substantially transversely to the longitudinal dimension of the main hose. In the latter case, the perforated wall of the supplementary hose advantageously takes the form of a series of spaced cylindrical segments separated by the cuts, the cuts concomitantly taking the form of cylindrical sections.

The cuts may alternatively take the form of wedge-shaped segments.

Owing to the increased elasticity of the supplementary hose due to the perforations, a vacuum cleaner hose according to the present invention exhibits a markedly decreased resistance to bending. A vacuum cleaner hose according to the present invention is simple to manufacture, inasmuch as the supplementary hose is particularly easy to fabricate.

BRIEF DESCRIPTION OF THE DRAWING

FIG. 1 is a perspective view of a vacuum cleaner hose in accordance with the present invention, showing a supplementary hose in the form of an open helix.

FIG. 2 is a perspective view similar to FIG. 1, showing a supplementary hose provided with radial cuts.

FIG. 3 is a perspective view similar to FIGS. 1 and 2, showing a supplementary hose with cuts in the form of wedge-shaped segments.

DETAILED DESCRIPTION OF THE INVENTION

As illustrated in FIG. 1, a vacuum cleaner hose comprises a main hose 1 having a corrugated casing or wall 7 extending in a longitudinal direction parallel to an axis 8 of the main hose. On its outside surface, wall 7 of main hose 1 is provided with a longitudinal groove or slot 2 extending parallel to axis 8. Into groove 2 a supplementary hose 3 in the form of an open helix is inserted and fastened to main hose 1. Supplementary or ancillary hose 3 houses an electrical line or lead (not shown) extending parallel to hose axis 8.

As illustrated in FIG. 2, the vacuum cleaner hose may be provided with a supplementary hose 3' in the form of a series of spaced cylindrical sections 5 separated by radial cylindrical cutouts 4 disposed transversely to hose axis 8. Successive cylindrical sections 5 of supplementary hose 3' are connected to one another via arcuate flanges 9. Cylindrical sections 5 and flanges 9 are attached to main hose wall 7 at groove 2. The resistance of the supplementary hose to bending is significantly lowered by radial cutouts 4. Supplementary hose 3' can be bent especially easily, particularly if cuts 4 are very deep, so that connecting strips or flanges 9 are narrow.

As illustrated in FIG. 3, the vacuum cleaner hose may be provided in accordance with the present invention with a supplementary hose 3" having spaced cutouts 6 in the form of wedge-shaped segments.

What is claimed is:

1. A vacuum cleaner component comprising:
   a flexible main hose having an enclosing wall extending in part in a longitudinal direction, said wall having on an outer surface a groove extending in said longitudinal direction; and
   a flexible supplementary hose for housing an electrical line extending in said longitudinal direction, said supplementary hose being attached to said main hose and disposed in part in said groove, said supplementary hose having a perforated wall for increased flexibility, said perforated wall substantially taking the form of a series of spaced cylindrical sections separated by cuts extending substantially transversely to said longitudinal direction.

2. The vacuum cleaner component defined in claim 1 wherein at least one of said cuts is in the form of a cyclindrical section.

3. The vacuum cleaner component defined in claim 1 wherein at least one of said cuts is in the form of a wedge-shaped segment.

4. A vacuum cleaner component comprising:
   a flexible main hose having an enclosing wall extending in part in a longitudinal direction, said wall having on an outer surface a groove extending in said longitudinal direction; and
   a flexible supplementary hose for housing an electrical line extending in said longitudinal direction, said supplementary hose being attached to said main hose and disposed in part in said groove, said supplementary hose having a perforated wall in the form of a helix for increased flexibility.

* * * * *